United States Patent Office.

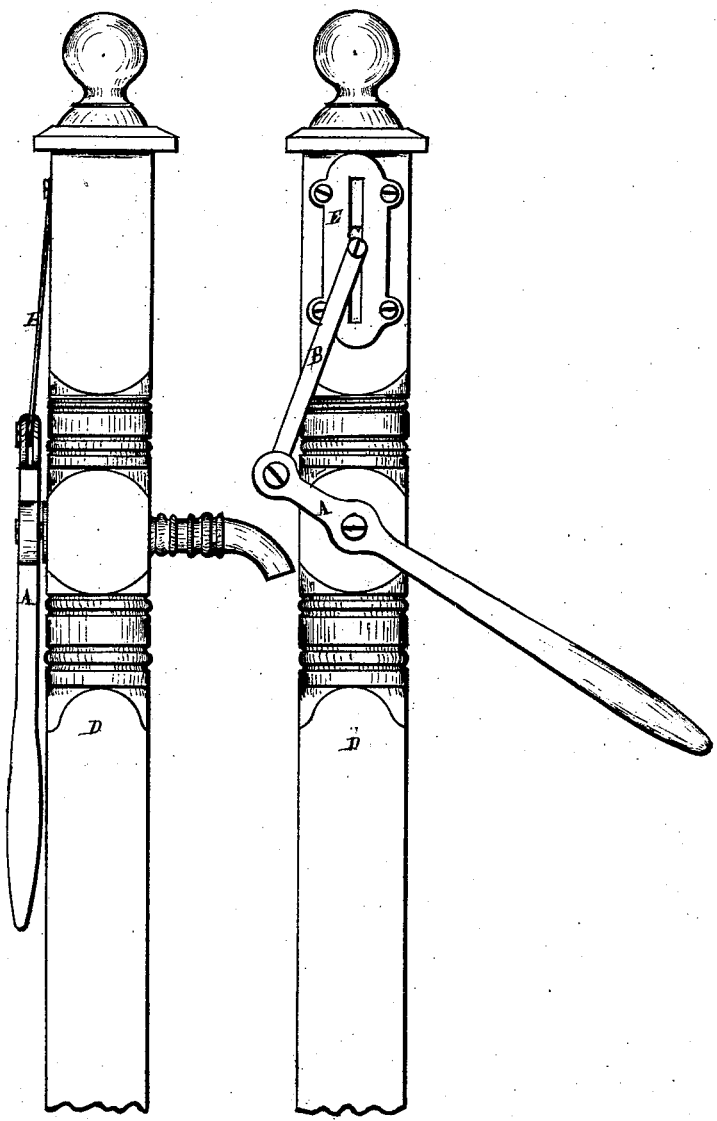

G. W. LOW, OF RAVENNA, OHIO.

Letters Patent No. 100,162, dated February 22, 1870.

IMPROVEMENT IN PUMPS.

The Schedule referred to in these Letters Patent and making part of the same.

*To all whom it may concern:*

Be it known that I, G. W. Low, of Ravenna, in the county of Portage, and State of Ohio, have invented certain new and useful Improvements in Pumps; and I do hereby declare that the following is a full and complete description of the same, reference being had to the accompanying drawings making part of this specification.

Objective.

The nature of this invention relates to the arrangement of a lever or handle, in connection with a link, for operating the pump-rod, and so combined with the stalk that it is not weakened by its being cut away to admit the working of the pump-handle, as and in the manner herein after described.

Drawings.

Figure 1 represents a side view.
Figure 2, a side view also.
Like letters of reference refer to like parts in the different views.

In the drawings—

A represents the lever or handle, as connected by a wrist-pin to the side of the pump. One end of said lever or handle is attached to the connecting-link B, the upper end of which is coupled by a joint to the pump-rod C.

The connection with the pump-rod passes through the slotted plate E, the purpose of which will presently be shown.

In the side of the pump-stalk D is cut a slot, over which is firmly secured a metallic plate, with a slot therein corresponding to the one cut in the pump, and over which it fits closely. The object of this plate is to strengthen the side of the pump and prevent the same from breaking and wearing away by the constant working of the link B thereon, and the slot herein mentioned serves as a guide to regulate the movements of the connecting-link and pump-rod in relation to each other.

It will readily be seen that this mode of constructing a pump possesses all the advantages of the larger ones, and without lessening the durability of the same.

Were I to cut away a large portion of the side of pump-stalk, as is the case in constructing large ones to admit of attaching the lever to the pump-rod in the ordinary way, the result would be this: the pump-stalk being small, would be very much weakened, thereby rendering it not durable and comparatively worthless; and instead of so doing, I cut the slot, as above described, and strengthen the pump by means of the metallic sheet encasing the slot, as before stated.

This style of construction will also be found very much easier operated than the small pumps heretofore used. They being so arranged that the handle at the top of pump is worked vertically, there being no lever purchase whatever, the working of the same requires considerable physical effort on the part of the operator, and is found very laborious.

The size of the pumps for cisterns in ordinary use is such that they do not admit of cutting away of the side of the stalk to fasten the lever, as is the case with larger well-pumps. Hence my improvement in the manner of attaching the lever to the pump rod, which may be done by means of the connecting-link either above or below the slot.

What I claim as my improvement and desire to secure by Letters Patent is—

The lever A, link B, and slotted plate or opening E, in combination with the pump-rod C and stalk D, when arranged in relation to each other substantially as and for the purpose set forth.

G. W. LOW.

Witnesses:
J. H. BURRIDGE,
D. L. HUMPHREY.